United States Patent [19]

Shah et al.

[11] 3,868,635

[45] Feb. 25, 1975

[54] FEATURE ENHANCEMENT CHARACTER RECOGNITION SYSTEM

[75] Inventors: Mahendra B. Shah, Annandale, Va.; Donald W. Russell, Potomac, Md.; Harold L. Bowman, Vienna, Va.

[73] Assignee: Optical Recognition Systems, Reston, Va.

[22] Filed: Dec. 15, 1972

[21] Appl. No.: 315,766

[52] U.S. Cl. ................ 340/146.3 MA, 340/146.3 Y, 340/146.3 C

[51] Int. Cl. ............................................ G06k 9/06

[58] Field of Search ........... 340/146.3 Y, 146.3 AQ, 340/146.3 MA, 146.3 AH, 146.3 H, 146.3 ED, 146.3 R, 172.5

[56] References Cited

UNITED STATES PATENTS

| | | | |
|---|---|---|---|
| 3,182,290 | 5/1965 | Rabinow | 340/146.3 AQ |
| 3,460,091 | 8/1969 | McCarthy et al. | 340/146.3 ED |
| 3,533,068 | 10/1970 | Hanaki et al. | 340/146.3 AH |
| 3,539,994 | 11/1970 | Clapper | 340/146.3 T |
| 3,585,588 | 6/1971 | Hardin et al. | 340/146.3 ED |
| 3,613,080 | 10/1971 | Angeloni et al. | 340/146.3 MA |
| 3,618,016 | 11/1971 | Van Steenis | 340/146.3 Y |
| 3,634,823 | 1/1972 | Dietrich et al. | 340/146.3 Y |

*Primary Examiner*—Gareth D. Shaw
*Assistant Examiner*—Leo H. Boudreau
*Attorney, Agent, or Firm*—Browne, Beveridge, DeGrandi & Kline

[57] ABSTRACT

A character recognition system in which the degree of acceptability of possible recognition decisions is determined and in which the recognition problem of choosing between a large number of characters may be reduced to a decision between a small number of characters which decision may be performed by specialized logic. A memory is provided which has stored information corresponding to features which could be found in each of the characters to be recognized. A second memory is provided which has stored information corresponding to features which should not be found in each of the characters. An up-down counting means is associated with each of the characters and with both memories. The memories are read out to the counters in accordance with feature signals inputted thereto and after all feature signals for a character have been inputted the counts obtained by the counters are evaluated. If any counter has greater than a predetermined minimum count and another counter has a count within a second predetermined minimum count away, a character pair is defined which is inputted to specialized logic to determine which of the two characters has been read.

7 Claims, 4 Drawing Figures

FEATURE ENHANCEMENT CHARACTER RECOGNITION SYSTEM

This invention relates to a character recognition system and method of improved accuracy and flexibility.

Any character to be recognized by a character recognition system may be conceptualized as being comprised of a number of features. A feature may be defined as being any property of the character and/or an electrical signal or signals corresponding to the character. Different classes of features have been used with different character recognition systems of the prior art and the present invention does not relate to the origination of such features or feature signals corresponding thereto, but rather to how such feature signals may be advantageously combined to improve the recognition process.

Many different classes of features have been used in prior art recognition systems. One such class of features is the relative amplitudes of the peaks of an analog signal generated by a magnetic head scanning a stylized magnetized character. Another class of such features is the number and size of vertical ink segments present in respective vertical slices of the character. Still another class of features is the presence or absence of ink at predetermined relative locations of the character. And still another class of features is the ratio of the amount of ink present at one character area to the amount of ink present at another character area. The above list of features is by no means intended to be exhaustive, but rather is provided to illustrate what is meant by the term "feature" in the present invention.

In prior art character recognition systems, the criterion for recognizing a processed character as a given character is established as being a predetermined minimum number of the total number of features which are ideally found in that given character. When the predetermined minimum number of features for one given character is exceeded, the processed character is identified as being the given character, whereas if the minimum number of features for the given character is not reached, the processed character is not identified as being that given character. If the predetermined minimum is not reached for any of the given characters included in the system or if it is reached for more than one of the given characters, then a reject signal is generated.

The problem with the above type of recognition system is that once the predetermined number of features for a single given character is present, a recognition decision is made without looking at how many of the features for the other given characters also may be present. For instance, if it takes ten features to identify a character the system will positively identify a character if ten features of one character are present, notwithstanding the fact that nine features of another character may be present. Since there is only a 10 percent difference of acceptability between the two characters, always selecting the character with ten features as the correct character will lead to errors. It is thus a disadvantage of the prior art recognition systems that they will either positively identify or reject a character being processed without looking at the degree of acceptability of the identification. Another disadvantage of some prior art recognition systems is that the failure of any one of the feature signals required for the recognition of a character will result in non-recognition.

Further, in prior art recognition systems it is common to connect all of the feature signals for each different character to a different AND gate or other piece of electronic hardware to determine whether or not the recognition criteria for that character has been met. A disadvantage of this type of system is that extensive rewiring of the AND gates or electronic hardware is required when the recognition criteria is changed.

It is therefore an object of the invention to provide a character recognition system and method in which the degree of acceptability of possible recognition decisions is determined.

It is a further object of the invention to reduce the character recognition problem of choosing between a large number of possible characters to a decision between a small number of possible characters which decision may be performed by specialized logic. It is still a further object of the invention to provide a system for recognizing a distorted character in which one of the anticipated features may be absent.

It is further object of the invention to provide a character recognition system where the recognition criteria for the different characters may be modified without rewiring.

The above objects are accomplished by providing a memory which has information stored therein corresponding to which features could be found in each of the characters to be recognized. A counting means is associated with each possible character and with the memory. Each feature signal is operative to read-out the bits of the memory into the counting means associated with the characters which include that feature. After the read-out for the character being processed is complete, the states of the counting means are evaluated. If no counting means has a predetermined minimum number of counts, a reject signal is generated. If any counting means has more than the minimum number and no other counting means has a count less than A second predetermined minimum of counts away, then the character associated with that counting means is identified. If any counting means has more than the minimum number and another counting means has a count within the second predetermined minimum count away, then a character pair or triplet is defined and a special feature enhancement logic system determines which of the two or three characters of the pair or triplet are selected. The locations in the memory at which said information is stored may be changed and hence the recognition criteria may be changed.

According to a preferred embodiment of the invention a second memory may also be utilized which has information stored therein corresponding to features which should not be found in each of the characters. Read-out of a bit stored in the first memory is arranged to step the counting means up and read out of a bit from the second memory is arranged to step the counting means down.

The invention will be better understood by reference to a preferred embodiment in the drawings in which.

Figures 1, 2:
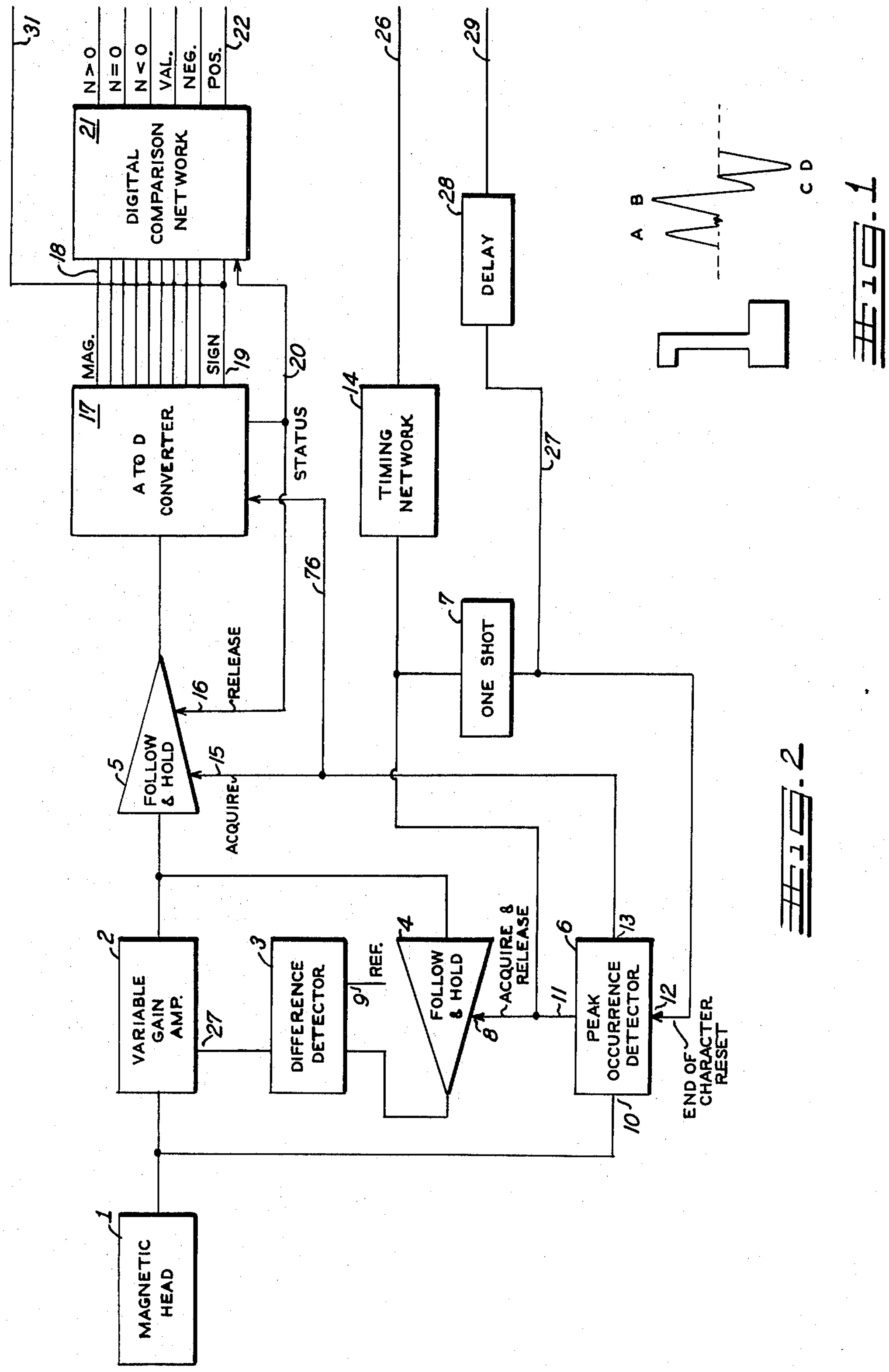
FIG. 1 represents an approximation of the numeral 1 in the E13B font along with a typical waveform generated by scanning this numeral with a single gap magnetic head.
FIG. 2 represents a block diagram of a magnetic character recognition system described in copending application Ser. No. 322,809 and included herein to more clearly illustrate the present invention.

It should be understood that FIGS. 1 and 2, which are described in copending application Ser. No. 322,809, assigned to the same assignee as the present application are included herein to clearly illustrate the generation of feature signals and that the subject matter of FIGS. 1 and 2 forms no part of the present invention. As indicated above, the present invention relates to a system and method for deriving a recognition signal from feature signals and not to the origination of the feature signals. Further, the feature signals may be generated with the use of an optical transducer as well as a magnetic transducer and may relate to any property of the character being recognized or the electrical signals into which they are transduced.

FIG. 1 includes an approximate representation of the numeral 1 of the E13B character font, which has been adopted by the American Banker's Association for use with banking checks in this country. The E13B font is used only for the purposes of illustrating the invention which is not intended to be limited thereto. When the numeral 1 shown in FIG. 1 is printed in magnetic ink, magnetized, and scanned with a single gap magnetic head which generates an electrical signal proportional to the time derivative of the flux passing through the gap, as known to those skilled in the art, a waveform such as shown in FIG. 1 results. Each character of the character font is designed so that it results in a unique analog waveform being generated when scanned by a single gap magnetic transducer.

Referring to FIG. 1, it is seen that the waveform includes positive peaks A and B and negative peaks C and D. The feature generation scheme described herein works by generating a digitally coded signal representative of the magnitude of peak B and comparing the signal to a digitally coded signal representative of the magnitude of peak A. A digitally coded signal representative of peak C is then compared to a digitally coded signal representative of the magnitude of peak B and in a like fashion, a digital signal corresponding to peak D is compared to a digital signal corresponding to peak C. The features defined by the system illustrated include the parameters of the relative magnitudes, polarity and time of occurrence of the peaks.

FIG. 2 shows a block diagram of a system. A document having characters printed thereon in magnetic ink is fed past a magnetizing head (not shown) which magnetizes the magnetic ink of the characters. The document is then transported past single gap magnetic head 1 which generates an analog electrical signal corresponding to the time derivative of the change in flux of the magnetized ink.

Due to the fact that different characters scanned may be printed in magnetic ink of different density, the electrical signals outputted by magnetic head 1 for different characters may vary over a relatively wide dynamic range. To handle this dynamic range variable gain amplifier 2, follow and hold network 4 and difference detector 3 form a keyed AGC loop which normalizes the magnitude of each of the character waveforms inputted thereto. The AGC loop operates by controlling the gain of variable gain amplifier 2 in accordance with the magnitude of the first peak of the waveform.

The peak occurrence detector 6, which is fed with the output signal from the magnetic head at input 10 is a network which detects the time of occurrence of each peak of the waveform. An output signal corresponding to the time of occurrence of each peak is generated at output 13. An output signal corresponding to the time of occurrence of the first peak of the waveform is generated at output 11 and held there until an end of character reset signal occurs at input 12. Network 6 may, for instance, include a zero slope detecting circuit which switches in the manner of a flip flop changing state on alternate zero slope points of the signal. The circuit would be connected to a pulse generator which would generate a pulse each time the circuit switches and the output signals of which would be present at output 13. The circuit would also be connected to a bistable network which would be set at output 11 by the first peak and which would not be reset until the occurrence of a signal at input 12. One shot delay network 7 would be adjusted to delay the signal at output 11 for the duration of one character scan at which time the signal would reset the bistable unit at input 12 and simultaneously appear at line 27.

The signal from variable gain amplifier 2 is directed to follow and hold module 4 which may be a commercial follow and hold module. The function of follow and hold module 4 is to track the analog signal from the amplifier 2 and to retain the voltage of the maximum excursion of the first pulse of the waveform. The follow and hold module is operative to follow its input until a signal from peak occurrence detector 6 occurs at input 8 whereupon follow and hold module 4 is operative to retain the voltage it has reached at that time. The voltage output of follow and hold module 4 is compared in difference detector 3 with a constant DC voltage which is present at input 9 and an error is generated and fed to variable gain amplifier 2 at gain control input 27 for controlling the gain of the amplifier. Follow and hold module 4 is reset at the end of each character by the disappearance of the signal at input 8. Thus, the gain of amplifier 2 is established by the magnitude of the first excursion of the analog waveform and is held constant throughout the passage of each character by the magnetic head.

The output of variable gain amplifier 2 is fed to follow and hold module 5, which may be a commercial follow and hold module. Follow and hold module 5 is operative to follow its analog input signal until it receives a signal at input 15 from peak occurrence detector 6 indicating that a peak of the waveform has occurred. At this time, follow and hold module 5 will retain the voltage it has reached and feed this voltage to A to D converter 17 which is triggered to convert a signal on line 76. A to D converter 17 may be a conventional commercial analog to digital converter module which converts the magnitude of its input signal to a 9 bit binary code as represented by lines 18. A to D converter 17 additionally has a line 19 on which a signal indicative of the sign of the input signal is generated and a status line 20 indicating that the A to D conversion has been completed. A status signal generated on line 20 is fed to input 16 of follow and hold module 5 to reset the follow and hold module and to allow it to begin to follow the next excursion of the waveform. Follow and hold module 5 thus retains the peak voltage for the length of time it takes A to D converter 17 to make the conversion and stabilize.

The coded digital signals for adjacent peaks are fed to digital comparison network 21, shown in greater detail in copending application Ser. No. 322,809, which provides output signals on lines 22 indicative of whether a signal fed to the network, known as the new signal, is a certain percentage greater than or less than, or equal to the previous signal fed to the network, known as the old signal. Additionally, digital comparison network 22 provides an output indicative of whether or not the new peak is a valid peak at all, or whether it is a spurious signal or noise and therefore not a valid peak. Additionally, network 21 has negative and positive putput lines which indicate whether the new signal is negative or positive.

When an E13B character is scanned by a single gap magnetic head, the peaks of the waveform should occur only at eight discrete times. The initial peak of the waveform is operative to trigger timing network 14 to produce seven equidistant timing pulses corresponding to the time of occurrence of the seven last possible peak positions of the waveform.

A feature is defined as a unique combination of 1) An $N > 0$ signal, an $N < 0$ signal or an $N = 0$ signal on one of lines 22, 2) A negative or positive signal or one of lines 22 and, 3) One of the seven possible timing signals on line 26.

Figure 3:
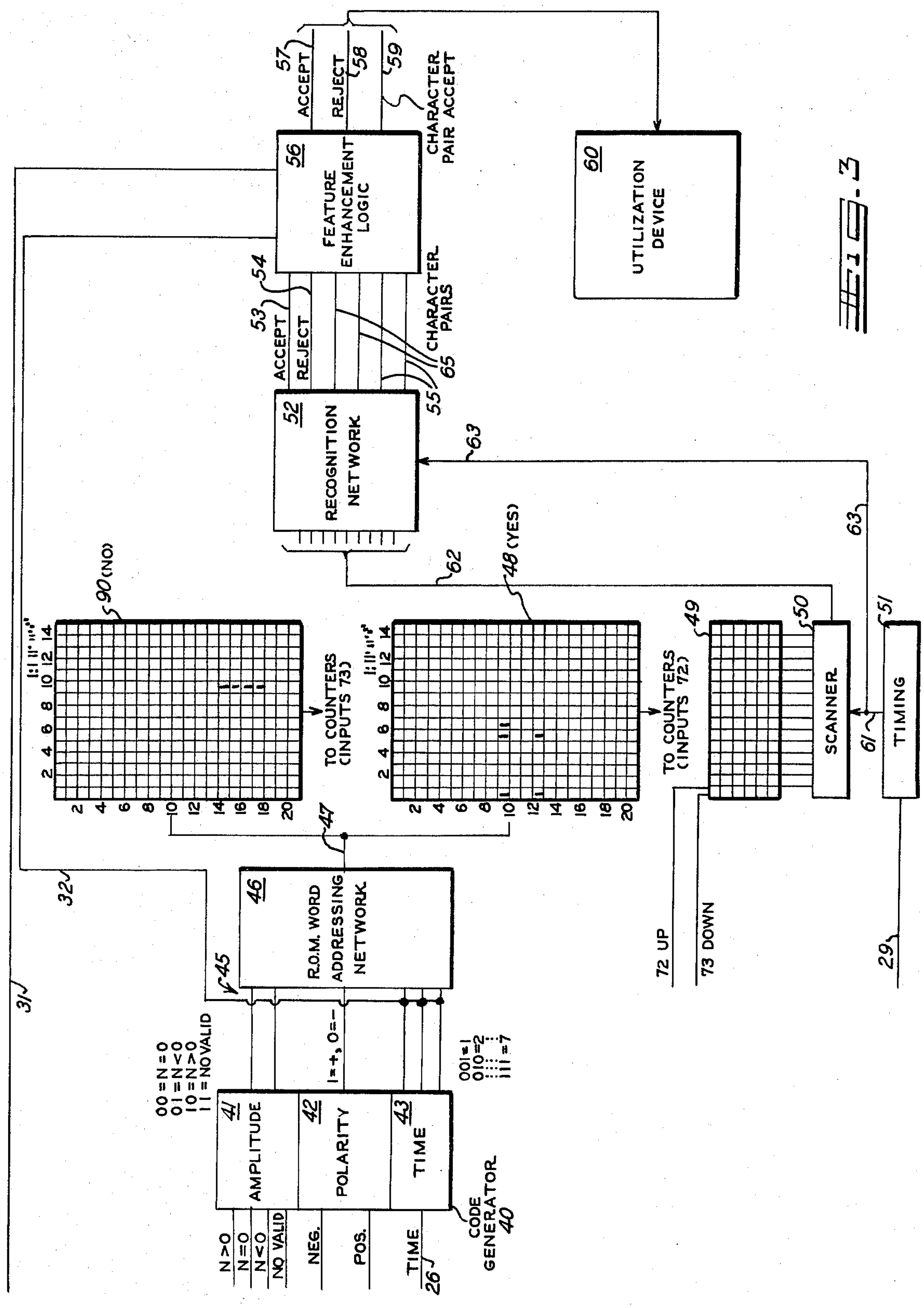
FIG. 3 represents a block diagram of a system according to the invention.

FIG. 3 is a block diagram of a recognition system according to the invention. Each feature of a character is inputted in succession to code generator 40 which is divided into amplitude code generator 41, polarity code generator 42 and time code generator 43. Code generator 40 generates a 6-bit digital output code in response to the signals on lines 22 and 26. Since there are four possible amplitude comparison states, $N > o$,$N < 0$, $N = 0$, and "no valid peak," a 2-bit code is used for the amplitude on 2 of lines 45 and a possible amplitude code configuration is shown at FIG. 3 above lines 45. Since the polarity can assume only 2 states, positive or negative, a one-bit digital code on one line 45 is used to indicate polarity and a possible code configuration is shown above the polarity output line in FIG. 3. Since there are seven possible comparison time slots, a 3-bit digital code is used to represent time and 3 output lines 45 are shown being fed out of time code generator 43 which could be a binary counter arranged to generate a 3-bit digital code output on lines 45. Standard digital notation for the numerals 1 through 7 may be used as shown below lines 45 in FIG. 3.

With the system shown in FIG. 3 there are $2^6$ or 64 different possible combinations of features possible. If each different combination of bits on lines 45 is denoted as a word, there are 64 different words possible. Lines 45 are fed. To word addressing network 46 which assigns each different combination of bits a unique word number and addresses memories 48 and 90 for reading-out that particular word.

Memory 48 is a word organized memory with different words being located in adjacent horizontal rows and each word extending the entire length of the row. As indicated above, the embodiment described in FIG. 3 may operate with as many as 64 different words but in an actual embodiment, it may not be necessary to utilize all of the words. While the memory 48 in FIG. 3 is shown having only 20 words for ease of illustration in an actual embodiment, probably more than 20 words would be utilized.

Each vertical row of bits in the memory is associated with a different character of the font being recognized. Thus, the 14 characters of the E13B font are diagrammatically shown above each of the 14 columns of the memory. The memory is initially addressed so that it stores a one-bit in each row word at the column position of each character in which the feature corresponding to the word may be present. Thus, if the word "ten" for instance represents the feature $N > 0$, positive, second comparison time slot, a 1-bit will be present in the word "ten" at the column positions of the characters one, six, and seven because each of these characters may include this feature. By referring to FIG. 1, it is seen that peak B is greater than peak A, is positive, and occurs in the second comparison time slot and thus that the character one includes this feature. If word "thirteen" for instance, corresponds to the feature $N < 0$, negative, third comparison time slot, then a 1-bit will be present at word 13 at column positions 1 and six because each of the characters corresponding to those column positions may have that feature. By referring to the waveform in FIG. 1, it is seen that the numeral one includes this feature. Each word in the memory is thus assigned to a different feature and has one-bits stored at the column positions of the characters which include that feature. While only two words are shown loaded in memory 48 of FIG. 3, it is to be understood that in an actual embodiment enough words to recognize all the character of the font would be present.

Memory 90 is identical to memory 48 and if memory 48 is denoted as a "yes" memory, memory 90 is a "no" memory. Memory 90 is initially addressed so that a one-bit is stored in selected row words at the column positions of characters in which the feature corresponding to the word should not be present. For example, in the E13B font the waveform for the character zero should not have any peaks at all at comparison time slots 2, 3, 4 and 5. If words 15, 16, 17 and 18 correspond to particular features having peaks at one of these time positions, then a 1-bit would be positioned in these words at the column corresponding to the zero.

An up-down counting means 49 is operatively associated with each column of memories 48 and 90. Each counting means 48 has an up input 72 and a down input 73. Each column of memory 48 is operatively connected to up input 72 of the counter corresponding to the column and each column of memory 90 is operatively connected to down input 73 of the counter corresponding to the column. When a word read-out signal is read out on line 47 each column bit of the row word in memory 48 is read out to an input 72 to count the corresponding counter up one and each column bit of the row word in memory 90 is read out to an input 73 to count the corresponding counter down one. For instance, in the example given in FIG. 3, if the word "ten" is read out, the one bits in column 1, 6 and 7 of memory 48 are read out to the corresponding counters to advance the counts thereof one count. On the other hand, if the word "fifteen" is read out, the 1-bit in column 10 of memory 90 is read out to the corresponding counter to decrease the count thereof one count. The up-down counting means may be standard digital counter, shift registers, or any other electronic counting means as known to those skilled in the art.

After an entire character has been scanned, then each counter 49 will have attained some count representative of how many of the features in that character are included in each of the characters of the font. Since in the system shown there are 7 time slots at which feature signals are derived, the maximum count which any counting means could have would be a count of seven.

According to the invention, a predetermined minimum count is necessary to recognize a character and in the system shown that minimum count may be, for example, five out of the seven possible features. If no counter has attained a count of five at the end of processing a signal from a character, then a reject is defined. If a counter has attained a count of at least five and no other counter is within a predetermined minimum count of that counter, such as for instance within two counts of that counter, then an acceptable character is defined as the character corresponding to that counter. If a counter attains a count of at least five and another counter has attained a count within the predetermined minimum, for instance if one counter attains a count of six and another attains a count of four, then a character pair is defined and signals indicative of that character pair are sent to special feature enhancement logic to determine which of the two possible characters should be selected. While the preferred embodiment of the invention is disclosed in terms of character pairs, it should be understood that any given system may use a set of more than two ambiguities. For instance, it is within the scope of the invention to use character triplets or quadruplets as well as character pairs. The contents of the yes and no memories may be arrived at by observing the ideal waveforms for the characters being processed, deciding which features could be found in each character and loading or initially addressing the yes memory with these features. The no memory may be selectively loaded with features which appear not to belong in each character. Since each actual recognition situation may vary from the ideal, initial loading or addressing decisions may be modified on an empirical basis and the matrix positions at which the bits are stored may be altered accordingly. The particular character pairs to be used in the system may also be determined by first observing the ideal waveforms and deciding which characters have a large number of features in common and by then modifying this decision if necessary, on the basis of actual experience.

Referring to FIG. 2, a signal appears at the output of one-shot multivibrator 7 on line 27 when the character has been fully scanned by magnetic head 1. This signal is delayed by delay network 28 for the propagation and processing time necessary for the signals to be processed by networks 41, 46, 48, 90 and 49 and a signal appears on line 29 after the counters 49 have completed being stepped through the character. The signal on line 29 activates timing network 51 which may be a well-known timing unit including a clock and a counter. Timing network 51 is arranged to generate 14 timing signals on line 61 before it resets itself, for controlling scanner 50. Scanner 50 may be a standard electronic or solid state scanner for scanning in succession the outputs of counters 49 in accordance with the timing signals on line 61. The outputs of counters 49 are fed in time succession on line 62 to recognition network 52. Simultaneously, the timing signals on line 61 are fed to recognition network 52 on line 63 so that network 52 knows which counter output appears on line 62.

Recognition network 52 is a logical decision network the exact design of which is within the ability of one skilled in the art for evaluating the outputs of counters 49 and deciding whether an accept signal, a reject signal or a character pair signal is to be generated. As discussed above, if none of the counters 49 has attained a pre-determined minimum count, then a coded reject signal is generated on line 54. If one of the counters has attained at least the pre-determined minimum count and none of the other counters are within a second predetermined minimum count of the count attained, then the code of the character corresponding to the counter which has attained the count is generated on line 53. If a counter has attained the pre-determined minimum count but a second counter is within the second predetermined count of the count attained, then recognition network 52 outputs character pair signals indicative of the characters associated with the two counters on a pair of lines such as 55 or 65.

An accept identification signal on line 53 will be transmitted directly through the feature enhancement logic block 56 without being modified thereby and will be outputted on line 57. Likewise, a reject signal on line 54 which may be a specific digital code will also be transmitted through block 56 without modification thereby and be outputted on line 58. The function of feature enhancement logic block 56 is to select one of the two possible characters of a character pair inputted either on lines 55 or 65 when recognition network 52 determines that an ambiguity exists. The feature enhancement logic block has inputs thereto on line 31 which is connected to outputs 18 and 19 of A to D converter 17 of FIG. 2. As will be described below in conjunction with FIG. 4, actually line 31 is a plurality of lines, each one of which is connected to a different output 18 or 19. In synchronism with the magnitude and sign signals fed in on line 31 a signal indicative of the time slot in which the magnitude and sign signals occur is fed on line 32.

The feature enhancement logic block is comprised of specialized logic circuitry which is arranged to make a decision between the two character code signals fed in on lines 55 or 65 on the basis of signals fed thereto on lines 31 and 32. One common character pair in the E13B font is the three-eight pair, which will frequently lead to ambiguous indications from recognition network 52 because the three and eight are identical except that the eight has a vertical bar in the fifth, sixth and seventh time slots while the three does not. If recognition network 52 determines that a three-eight character pair exists on the basis of the outputs of counters 49, then it outputs the digital code for a three on one of lines 55 and the digital code for an eight on the other of lines 55. Network 56 upon receiving the signals for three and an eight on input lines 55 is arranged to determine on the basis of the signals coming in on lines 31 and 32 whether the character being processed is a three or an eight and output the appropriate digitally coded signal on character pair accept line 59. Network 56 may also be arranged to produce a reject output on line 58 if it cannot satisfactorily distinguish between the characters of the character pair.

Figure 4:
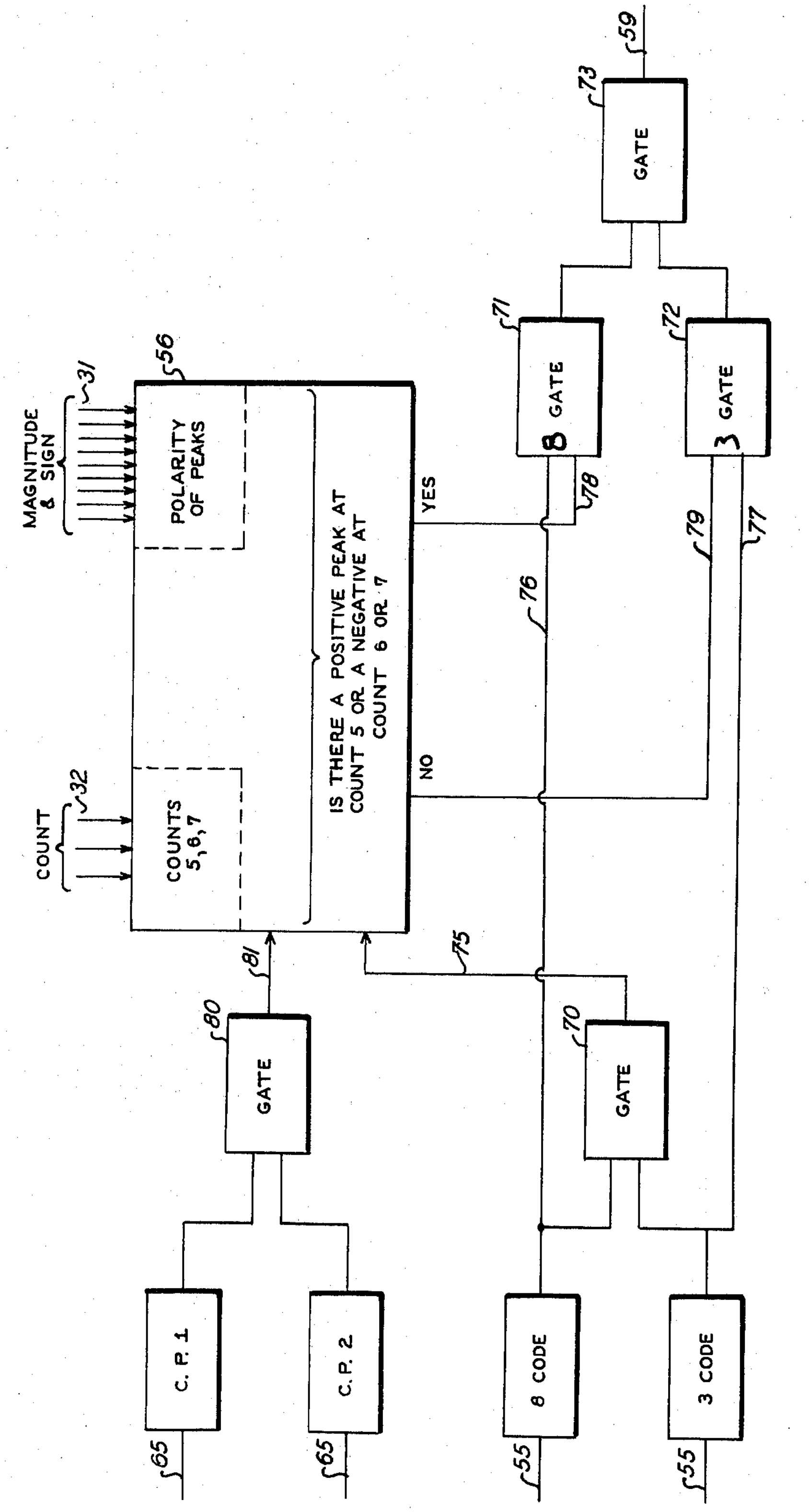
FIG. 4 represents a diagram of an example of the feature enhancement logic of FIG. 3.

FIG. 4 illustrates a preferred embodiment of the feature enhancement logic block 56 of FIG. 3 in greater detail. In this figure block 56 is shown having logic therein to discriminate between the character pair three-eight. Digitally coded signals indicative of both the three and the eight are shown being inputted to network 70 which produces a signal at line 75 which is inputted to block 56 and which triggers block 56 to perform the specialized logic routine for discrimination between the three and the eight stored therein. Block 56 has as many logic routines stored therein as there are character pairs defined in the system. For instance, when signals appear simultaneously on lines 65 indicating that another character pair has been indicated by recognition network 52, network 80 is activated to provide an input signal to block 56 on line 81 to trigger block 56 into the logic routine for that particular character pair.

The logic routine for the three-eight pair is indicated inside of block 56 in FIG. 4. Since the eight differs from the three in that the eight has a positive peak an comparison time slot 5, and a negative peak at comparison time slots 6 and 7, while the three does not, the logic for the three-eight character pair determines whether or not any such peaks are present. If any of these peaks are present, an output signal appears on line 78 which is fed to gate 71 which is also connected to line 76 having thereon a signal indicative of the digital code of the character 8. Such a signal is thus gated to the output of gate 71. If none of such peaks are present, then a signal appears on line 79 which is fed to gate 72. Gate 72 also is fed with line 77 having thereon a signal indicative of the digital code of the character 3 and this signal is gated through to the output of AND gate 72. Gate 73 is arranged to gate either coded signal at its input to its output and so gates through either the identification signal for a three or an eight. While only the preserve and polarity of the peaks at comparison times 5, 6 and 7 is significant in the logic for the three-eight pair the logic for other character pairs may be arranged to also make decisions on the basis of the amplitudes of the peaks.

It should be understood that the definitions of the character pairs and the particular logic routines performed in block 56 to distinguish between the signals of a character pair will vary from character font to character font. Also, instead of only A to D converter output lines being fed to block 56, the digital comparison network output lines 22 or 45 may also be fed thereto, thereby providing block 56 with even more information based on which the logic thereof can distinguish between the characters of a character pair. The feature enhancement aspect of the present invention thus makes it possible to reduce a decision which initially was between, for instance, 14 characters of a character font to a highly specialized decision between a small number of characters of the same font.

The term row in the claims is intended to encompass both horizontal and vertical rows and where row is interpreted to mean horizontal and recited columns are vertical and vice versa.

While we have disclosed and described the preferred embodiments of our invention, we wish it understood that we do not intend to be restricted solely thereto, but that we do intend to include all embodiments thereof which would be apparent to one skilled in the art and which come within the spirit and scope of our invention.

What we claim is:

1. A character recognition system for recognizing the characters of a character font, each character being comprised of a unique configuration of predetermined features comprising; means for exposing each of said characters to a transducer, means for generating at least a signal representative of each character, means responsive to said at least a signal for sequentially generating a plurality of feature signals for each character corresponding to the features of that character, a memory means comprised of a matrix of bistable elements for storing information bits, the rows of which correspond to features and the columns of which correspond to the said characters, said memory having information bits stored in each feature row at the character columns corresponding to the characters which include that feature, the matrix positions at which said bits are stored in said memory means being alterable, a counting means associated with each character, and means for reading out the bits in each feature row when the corresponding feature signal is generated to activate the counting means associated with the character columns in which said bits are stored, means responsive to the outputs of said counting means for generating a recognition signal corresponding to one of said characters.

2. The system of claim 1 further including a second matrix memory means for storing information indicative of which of said predetermined features are not associated with each of the characters to be recognized.

3. The system of claim 2 wherein said means for generating a character recognition signal includes means for determining whether any of said counting means has reached a predetermined minimum count.

4. The system of claim 3 wherein said means for generating a character recognition signal includes means for determining if any of said counting means has reached a count within a predetermined number of a counting means which has reached said predetermined minimum count.

5. The system of claim 4 wherein said means for generating a character recognition signal includes means for generating said character recognition signal when one of said counting means has reached said predetermined minimum count and no other counting means has reached a count within said predetermined number of said predetermined minimum count.

6. The system of claim 5 further including feature enhancement logic means for causing the generation of a coded character recognition signal indicative of one of the characters associated with a pair of counting means, at least one of which has reached said predetermined minimum count and the other of which has reached a count within said predetermined number of said predetermined minimum count.

7. The system of claim 6 wherein said feature enhancement logic means has feature signals derived from said characters associated with said pair of counting means inputted thereto, said feature enhancement logic means including means for selecting which of said coded signals associated with said pair of counting means is to be generated on the basis of said feature signals.

* * * * *